United States Patent [19]
Robertson

[11] 3,977,691
[45] Aug. 31, 1976

[54] EXTENDABLE AND FLEXIBLE TRAILER MECHANISM

[76] Inventor: Paul E. Robertson, 1129 Grimmet Drive, Shreveport, La. 71107

[22] Filed: Jan. 10, 1975

[21] Appl. No.: 540,284

[52] U.S. Cl. .............................. 280/81 R; 280/404
[51] Int. Cl.² ......................................... B62D 21/14
[58] Field of Search ............ 280/415 B, 34 A, 80 B, 280/81 R, 34 R, 106 T, 405 R, 400, 404

[56] References Cited
UNITED STATES PATENTS

| | | | |
|---|---|---|---|
| 2,032,721 | 3/1936 | Schaefer | 280/404 X |
| 2,100,612 | 11/1937 | Potts | 280/404 X |
| 2,119,800 | 6/1938 | Tull | 280/106 T X |
| 2,741,489 | 4/1956 | Bigge | 280/106 T X |
| 2,900,198 | 8/1959 | Patton | 280/34 A X |
| 3,685,853 | 8/1972 | Goldsmith | 280/81 R |
| 3,752,496 | 8/1973 | Meinecke | 280/405 R |
| 3,827,721 | 8/1974 | Coval | 280/400 |

*Primary Examiner*—M. H. Wood, Jr.
*Assistant Examiner*—R. Schrecengost
*Attorney, Agent, or Firm*—Bard, Springs & Jackson

[57] ABSTRACT

An extendable and flexible trailer mechanism according to the present invention is adapted to be towed by a tractor on a roadway and the length of the trailer mechanism is adjustable between minimum and maximum lengths in order to accommodate loads of varying length. The trailer mechanism may include front and rear chassis means, the spacing of which may be varied by varying the position of a telescoping flexible connector element that has telescoping relationship with at least one of the chassis means. Each of the chassis means may be supported by separate wheel and axle assemblies that may be disposed in justaposed relation in the contracted condition of the trailer mechanism and may be disposed in spaced relation in the extended condition thereof. The chassis means may cooperate in such a manner that they are disposed in substantially rigid relation when the trailer mechanism is contracted and, through the flexible connection therebetween, have substantial relative movement when the trailer mechanism is extended. Locking devices are provided to secure the chassis structures in assembly both in the contracted and extended condition of the trailer mechanism.

17 Claims, 7 Drawing Figures

EXTENDABLE AND FLEXIBLE TRAILER MECHANISM

FIELD OF THE INVENTION

This invention relates generally to trailers that are adapted to be towed by tractor mechanisms over roadways and particularly to trailer mechanisms that are adapted to haul loads that may be extremely long. More specifically, ths invention is directed to trailer mechanisms that are of variable length in order to accommodate extremely long loads and which are also constructed to present undue stressing of the trailer mechanism by changes in grade of the roadways over which the trailer mechanism may be towed.

BACKGROUND OF THE INVENTION

It is frequently desirable to transport long objects over roadways and, where objects are of sufficient length to exceed the length capability of a particular trailer adapted to be towed by a tractor mechanism, it is typically necessary for a special permit to be obtained from a governmental agency for such transportation. Of course, obtaining special permits for hauling over-length loads is time consuming and expensive and can cause sufficient delay in transportation that the transportation becomes inefficient or expensive to the point that the commercial feasibility of such transportation is severely limited. Also, it may be necessary for over-size or over-length loads to be escorted by law enforcement personnel having control of the particular roadway involved. This is also undesirable and expensive.

Where over-length loads are to be transported by truck and trailer assemblies over roadways, and the loads are of flexible nature, such as when steel reenforcing bars or pipe are hauled, it is typically necessary to contract for transportation of such loads by specially designed vehicles, which of course increases the cost of transportation and typically renders it commercially undesirable. The bridging laws, enforced by many states, create another problem, because such laws typically require a certain minimum spacing between the front and rear wheels of a truck and trailer assembly. These laws also impose other requirements which make it desirable to facilitate adjustment of at least a part of the rear wheel assembly of the trailer in order to support extremely long loads and yet conform to the particular bridging laws under enforcement in the area of operation.

Accordingly, it is a primary feature of the present invention to provide a novel extendable trailer mechanism for a truck and trailer assembly having separable front and rear chassis assemblies, each being supported by a wheel and axle assembly wherein the rear chassis may be extended from the front chassis to extend the overall length of the trailer assembly and to accomplish optimum spacing of the axles thereof.

It is another feature of the present invention to provide a novel extendable trailer mechanism, wherein front and rear chassis assemblies are provided having extension means that are disposed in telescoping relation and are adapted to be utilized in both contracted and extended positions for transporting loads of various length.

Another specific feature of the present invention involves the provision of an extendable trailer mechanism having front and rear chassis assemblies that are disposed in rigid relation in the contracted condition thereof and are interconnected in the extended condition thereof by a flexible connecting element that allows relative vertical movement between the adjacent wheels of the chassis assemblies to compensate for changes in grade of the roadway over which the trailer mechanism is towed, without placing undue stressing on either of the chassis assemblies as the tractor and trailer assemblies are operated over undulating roadways.

Among the several features of the present invention is contemplated the provision of a novel extendable trailer mechanism having front and rear chassis assemblies that are telescopically related and which mechanism includes locking means that positively secures the front and rear chassis structures in assembly in both the contracted and extended conditions of the trailer mechanism.

It is another feature of the present invention to provide an extendable trailer mechanism wherein more than two chassis structures are provided and each of the chassis may be disposed in extendable relation one with the other and may be interconnected by flexible connector elements that are telescopically related to one or more of the chassis mechanisms.

It is also an important feature of the present invention to provide an extension mechanism for trailer mechanisms which may be readily added by simple and low cost assembly to existing conventional trailer mechanisms to modify the same for transportation of loads of excessive length.

It is also an important feature of the present invention to provide a novel extendable trailer mechanism that is of simple nature, is reliable in use and low in cost.

Other and further objects, advantages and features of the present invention will become apparent to one skilled in the art upon consideration of the written specification, the appended claims and the annexed drawings. The form of the invention, which will now be described in detail, illustrates the general principles of the invention, but it is to be understood that this detailed description is not to be taken as limiting the scope of the present invention.

SUMMARY OF THE INVENTION

In accordance with the present invention a trailer mechanism may be provided having a front chassis structure including reciprocal means for receiving a telescoping connector receptacle with a first locking means being provided adjacent the rear extremity of the front chassis structure and a second locking means being provided intermediate the extremities of the front chassis. A rear or second chassis assembly may be disposed in extendable and contractable relation with the front chassis assembly and may be provided with locking connector elements at the front extremity thereof which may be engaged with the first locking means of the front chassis assembly in the contracted condition of the chassie assemblies in order to retain the chassis assemblies in substantially rigid relation one with the other. Each of the chassis assemblies may be provided with independent wheel and axle assemblies for support thereof on the roadway.

A flexible connector element, which may conveniently take the form of a flat elongated flexible plate may be disposed in fixed relation with one of the chassis assemblies and may be disposed in adjustable telescoping relation with the other of the chassis assemblies. To the forward extremity of the flexible connector plate may be fixed a locking connector assembly that may be adapted for locking engagement with the second locking means of the first chassis assembly in the extended condition of the first and second chassies thereby providing for locking of the front and rear chassis assemblies in the extended condition thereof. Additional locking means may be provided on the front chassis assembly if desired to enable the rear chassis assembly to be adjustably positionable at various lengths between the fully extended and fully contracted positions thereof if desired.

In the contracted condition of the front and rear chassis assemblies, the elongated flexible connector plate is telescopically received by one of the chassis assemblies and locking engagement is achieved directly between the chassis assemblies to retain them in substantially rigid relation one to the other, allowing only slight relative movement to accommodate undulating terrain without excessively stressing either of the chassis assemblies or the connector plate.

In the extended position of the front and rear chassis assemblies, the flexible connector element will yield both upwardly and downwardly relative to an unstressed plane defined thereby, thereby allowing relative vertical movement between the front and rear chassis assemblies.

Where more than two chassis assemblies are employed and adjustable flexible connections are established between each of the chassis assemblies, similar construction may be employed for establishing flexible connection and telescoping relationships between the chassis assemblies. The rear-most one of the chassis assemblies may be provided with a bumper structure which may be extensible relative to the rear-most chassis assembly as desired.

The flexible connection assembly that establishes flexible and adjustable interconnection between trailer chassis assemblies of a trailer mechanism is of very simple nature and easily affords simple and inexpensive modification of conventional flat bed trailer mechanisms to convert them to extendable trailers in accordance with the present invention.

BRIEF DESCRIPTION OF THE DRAWINGS

So that the manner in which the above recited features, advantages and objects of the present invention, as well as others which will become apparent, are attained and can be understood in detail, more particular description of the invention, briefly summarized above, may be had by reference to the embodiment thereof which is illustrated in the appended drawings, which drawings form a part of this specification.

It is to be noted, however, that the appended drawings illustrate only typical embodiments of the invention and are therefore not to be considered as limiting of its scope, for the invention may admit to other effective embodiments.

In the Drawings.

DESCRIPTION OF THE PREFERRED EMBODIMENT

Figure 1:
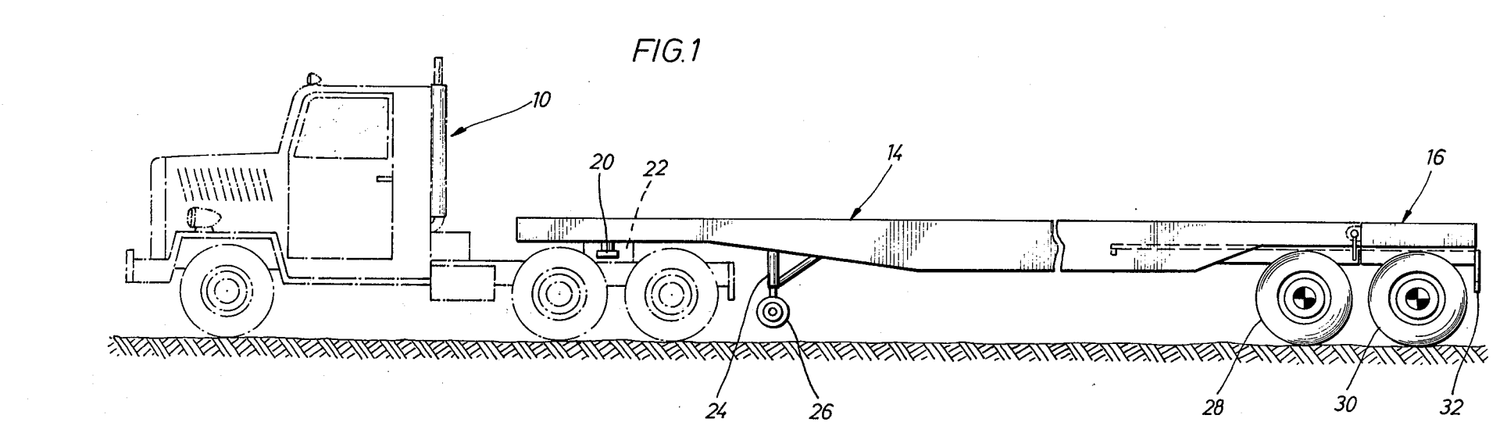
FIG. 1 is a side elevational view of a tractor and trailer assembly, the trailer assembly being constructed in accordance with the present invention and being shown in the contracted condition thereof.
Figure 2:
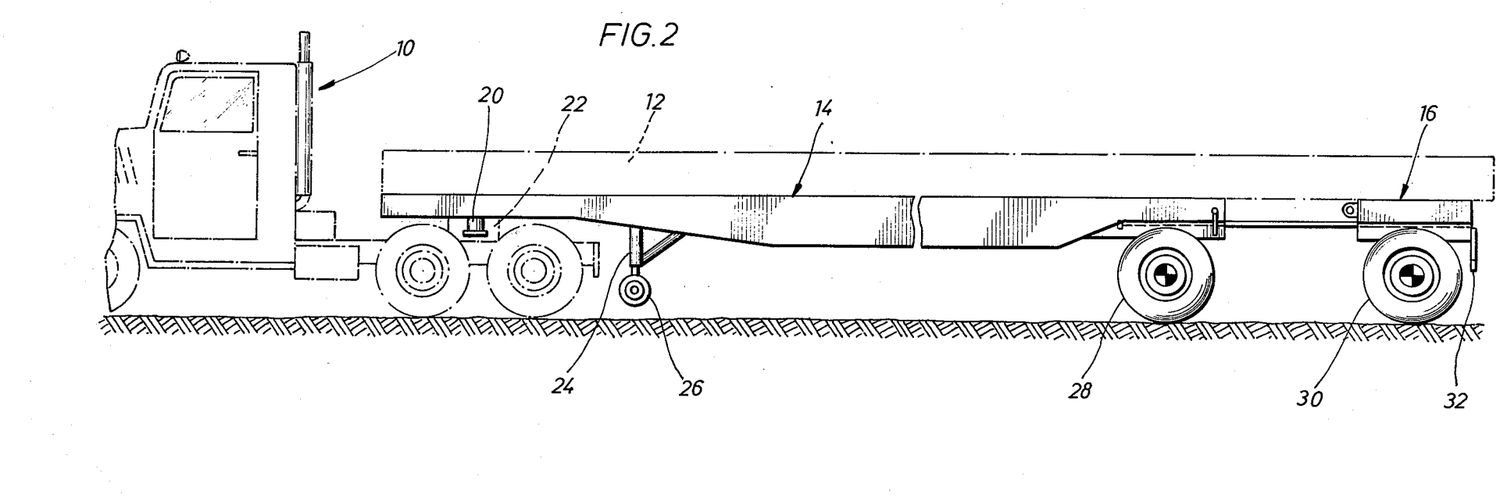
FIG. 2 is a side elevational view of the truck and trailer assembly shown in FIG. 1 with the trailer mechanism being illustrated in the extended condition thereof.

Referring now to the drawings and first to FIGS. 1 and 2, a tractor device is illustrated in broken line generally at 10 that is of a type typically employed in providing the motive power for transportation of a tractor and trailer assembly over a roadway for transporting various loads. A long load, which may be considered an over-length load for conventional trailer mechanisms and which is depicted by reference character 12, may be supported by front and rear trailer chassis assemblies illustrated generally at 14 and 16 respectively. For example, it is typically desirable to transport long pipes or tubing sections such as might be employed in oil field well drilling operations and to transport long bars of reenforcing metal such as might be utilized for reinforcing concrete and the like. The load may also take the form of beams such as may be utilized in construction of buildings, bridges, etc.

For transporting long loads in accordance with the present invention the chassis assemblies may be adjustably disposed in extended and contracted relationship to compensate for transportation of loads of varying length. The trailer mechanism may be provided with a typical fifth wheel connection 20 at the forward extremity thereof enabling connection of the trailer to a conventional fifth wheel trailer connecton structure of the tractor 10, illustrated in broken line at 22. The front end of the trailer mechanism, when not connected to the fifth wheel assembly of the tractor vehicle, may be supported by an auxiliary support strut 24 of conventional nature havng small support wheel elements 26 that serve as roadway engaging elements to allow the trailer mechanism to be moved while it is not supported by the tractor vehicle. The auxiliary support assembly may be pivotally connected to the trailer in such manner that it may be raised mechanically if desired to clear the roadway essentially as shown in FIGS. 1 and 2.

The rear chassis assembly 16, as shown in FIG. 2, may be extended from the front chassis assembly 14, thereby increasing the overall length of the trailer mechanism by a considerable extent and allowing the trailer mechanism to accommodate loads of greater length while conforming the trailer mechanism to the bridging and over-length laws of most governmental agencies. The front and rear trailer assemblies may be provided with individual and wheel axle assemblies 28 and 30, respectively, for roadway engagement. Additionally, the rear chassis structure 16 may be provided with a bumper assembly 32 which may also be adjustably disposed relative to the rear chassis assembly thereby enabling the bumper assembly to be extended to further increase the overall length of the trailer mechanism in order to provide a bumper structure at more nearly the trailing extremity of the load, if desired. The rear bumper assembly, if desired, may conveniently take the form shown in U.S. Pat. No. 3,838,868 issued on Oct. 1, 1974 to Paul E. Robertson.

It is typically necessary to provide for articulation between the tractor and a trailer assembly towed thereby in order to prevent excessive strain from developing in the tractor or trailer structure while transportation is taking place over a roadway of changing grade. In the typical tractor and trailer assembly, the fifth wheel mechanism 22 provides the degree of vertical axis articulation that is necessary for turning corners, etc. Although vertical articulation of one rear axle assembly to the other axle assembly of a trailer mechanism is not typically necessary when a rear wheel assembly of a trailer is extended a substantial distance from another rear wheel assembly, it may be desirable to provide for relative movement between the wheel assemblies and the chassis structure related to the wheel assemblies in order to prevent the wheel assemblies and the related chassis structure from becoming excessively stressed as rapidly changing grades are negotiated during operating conditions. In typical trailer assemblies relative movement between the axles thereof may be accommodated by independent suspension devices that allow the necessary relative movement, bearing in mind that typically the wheel and axle assemblies of typical trailer mechanisms will be only a few inches apart. The relative movement that is necessary to accommodate undulating terrain can be accounted for by springs, air inflated supports and other elements of the trailer running gear.

Figure 3:
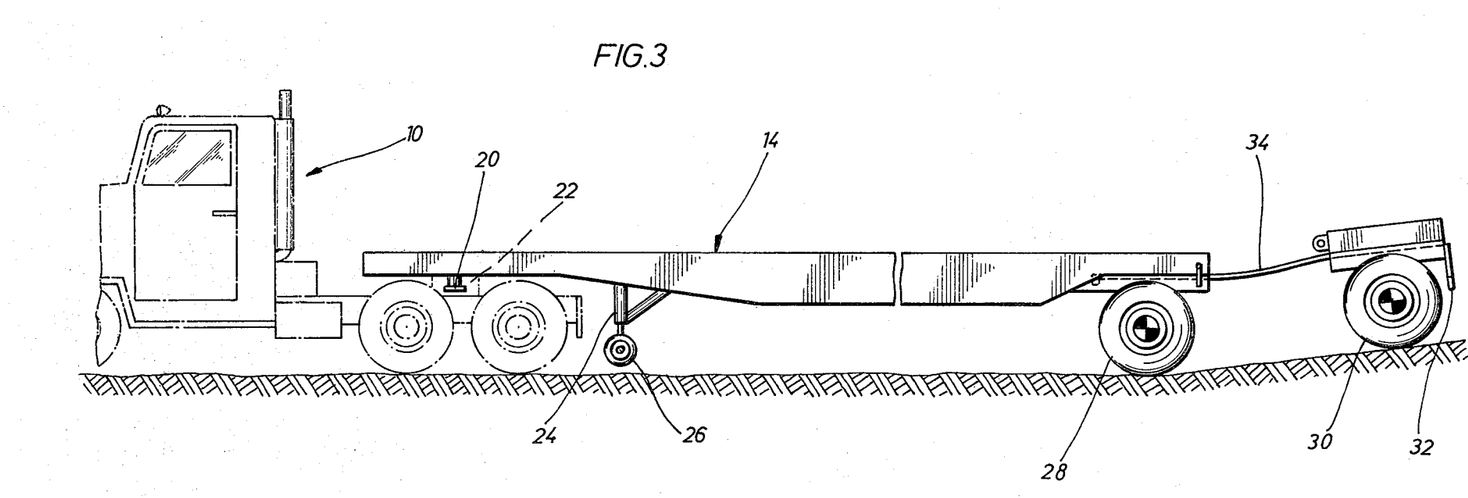
FIG. 3 is a side elevational view of the truck and trailer assembly of FIGS. 1 and 2 illustrating bending of a flexible connection between front and rear chassis assemblies of the trailer mechanism responsive to towing thereof over undulating terrain.
Figure 4:
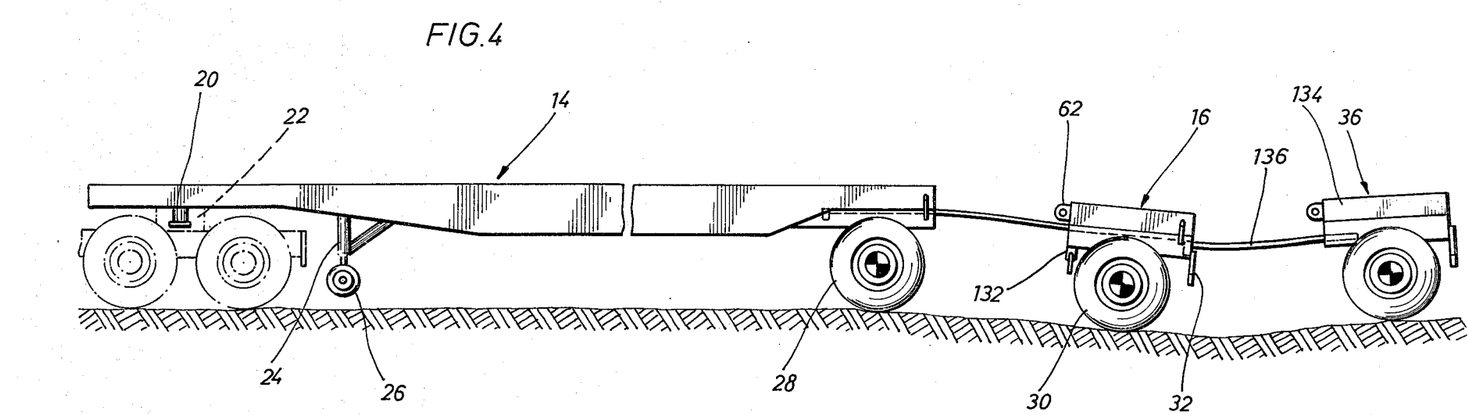
FIG. 4 is a side elevational view of the trailer assembly of FIG. 3 illustrating downward bending of the flexible connector element that interconnects the front and rear chassis assemblies. Also shown in FIG. 4 is an additional chassis structure having an extendable and contractable relationship with the chassis structure shown in full line thereby allowing for further extension of the trailer mechanism to accommodate loads of excessive length and weight.

When front and rear chassis assemblies are spaced such as shown in FIG. 2, ordinary truck suspension systems will not be capable of providing the degree of relative chassis movement that is necessary for protection against overstressing of the chassis structures. As illustrated in FIGS. 3 and 4, rapidly changing roadway grades may be accommodated by establishing a flexible connection between the front and rear chassis structure of the trailer mechanism 14. In accordance with the present invention, a flexible interconnection between the front and rear trailer assemblies may conveniently take the form of a substantially flat flexible connector plate 34 which may be composed of flexible steel or any other suitable flexible high strength material having resistance to fatigue. The connector plate may be fixed relative to one of the chassis assemblies and may be telescopically adjustable relative to the other chassis assembly. while the flexible connector plate 34 is illustrated in the drawings as being telescopically related to the front chassis assembly 16, it is not intended to limit the present invention specifically to this structure, it being obvious that the flexible connector plate may be fixed to the front chassis assembly and may be telescopically related to the rear chassis assembly as desired without departing from the spirit and scope of the present invention.

With reference to FIG. 4, a third trailer chassis structure 36 is shown to be disposed in trailing relationship with the chassis structures 14 and 16. The specific structure of the chassis 36 and its connecting relation with chassis structure 16 will be described in detail hereinbelow. It is only important at this point to recognize that a plurality of chassis structures may be employed, each of which may have an interlocking relationship with the adjacent chassis structure and each of which may be extendable to a position that effectively extends the overall length of the trailer assembly to provide for transportation of overlength and overweight loads.

Figures 5, 6, 7:
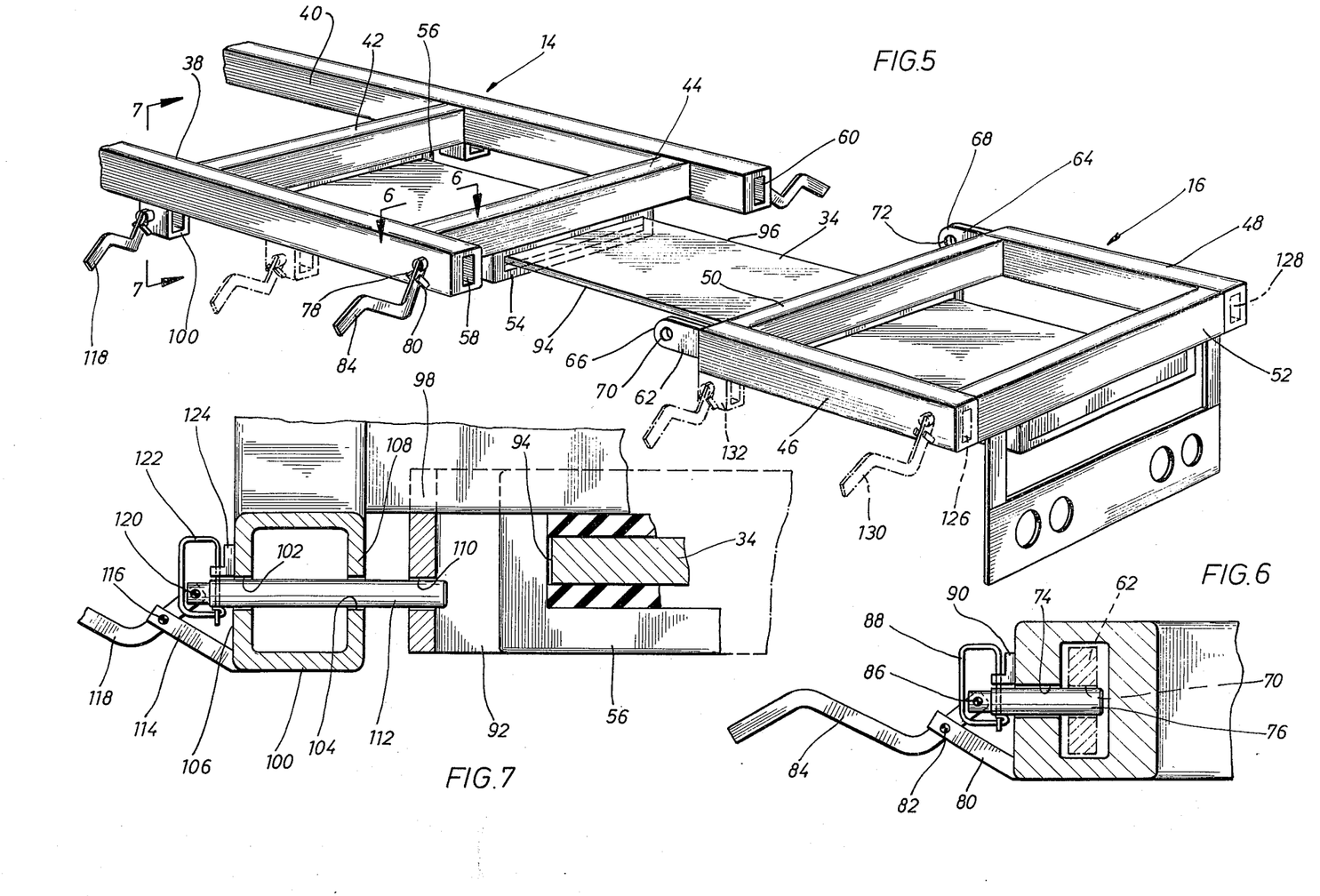
FIG. 5 is an isometric view of a portion of the front chassis structure of the trailer assembly set forth in FIGS. 1–3, showing the rear chassis structure and depicting extension of the chassis structures being maintained by an elongated flexible connector element.
FIG. 6 is a fragmentary sectional view taken along line 6–6 of FIG. 5 and showing the detailed structure of the first locking means.
FIG. 7 is a fragmentary sectional view taken along line 7–7 of FIG. 5 and depicting the structural detail of the second locking means.

Referring now to FIG. 5, the front chassis structure, illustrated generally at 14, may incorporate a pair of spaced longitudinal structural elements 38 and 40, which may be of tubular rectangular configuration and which may form a part of the structural framework of the trailer assembly. Transverse structural elements 42 and 44 may be welded to or otherwise connected between the longitudinal structural elements 38 and 40 to further strengthen the underframe structure of the trailer assembly. Other transverse structural elements may also be incorporated into the underframe structure but which are not shown for purposes of simplicity.

The trailer chassis structure illustrated generally at 16 will be provided with a separate structural framework which may include a pair of side structural elements 46 and 48 which may also be of rectangular tubular configuration as well as of any other suitable configuration, to which side structural elements may be welded or otherwise fixed front and rear transverse structural elements 50 and 52, respectively.

Assuming the extensible connector element 34 to be disposed in fixed relation to the rear trailer chassis 16 and in adjustable relationship with the front chassis structure 14, it will be desirable to provide the front chassis structure with connector receiver structure to provide for receiving the connector element in telescoping relation therewith. In accordance with the present invention, the front trailer chassis 14 may be provided with a pair of spaced connector hanger elements 54 and 56, each of which being connected to the underside of a respective transverse structural element by welding or any other suitable means of connection. The hanger elements 54 and 56 each define an opening of a size sufficient to receive the connector plate element 34 in movable relation therein, with the connector element being received by each of the hanger structures in both the contracted and extended positions thereof.

It will be desirable to provide means for establishing a substantially fixed relationship between the front and rear chassis structures in both the contracted and extended positions thereof. According to the present invention, the longitudinal structural elements 38 and 40 may be of a configuration defining latching openings and 58 and 60, respectively, that are adapted to receive a pair of locking projections 62 and 64 being fixed to the forward extremity of the rear chassis structure 16. The locking projections 62 and 64 may define rounded extremities 66 and 68 that serve to facilitate entry of the projections into the respective latching apertures 58 and 60. When the front and rear chassis structures 14 and 16 are brought into assembled contracted relationship, the projections 62 and 64 will enter the openings 58 and 60 sufficiently to cause locking apertures 70 and 72 of the locking projections to become registered with locking passages 74 formed in the respective elongated structural members 38 and 40 in the manner illustrated in FIG. 6.

After the locking projections 62 and 64 have entered the respective apertures 58 and 60, it will be desirable to secure the front and rear chassis structures 14 and 16 in substantially rigid assembly. To provide for such locking, a pair of locking pins 76 may be provided that may be positioned through the registering passage 74 and aperture 70 in the manner shown in FIG. 6. The locking pins 76 may be manipulated by a pin actuating mechanism such as shown in FIG. 6. A pair of spaced handle support elements 78 and 80 may be fixed to each of the longitudinal structural elements 38 and 40, such as by welding or the like and may define registering apertures within which may be disposed a pivot pin 82. The pivot pin provides pivotal support for an operating handle 84 having an operating extremity thereof secured within a slot defined at one extremity of the locking pin 76 by means of a pivot element 86. As shown in FIG. 6, downward movement of the operating handle 84, causing pivoting of the operating handle about the pivot element 82, will cause the locking pin 76 to be extracted from the registering passage and aperture. When the locking pin has cleared the apertures 70 and 72, the respective locking projections 62 and 64 will be released, allowing the front and rear trailer chassis structures to be free for relative movement.

It will also be desirable to provide means for securing the locking pins in the locking position illustrated in FIG. 6. According to the present invention, such means may conveniently take the form of a safety clip 88 that may be extended through registering safety clip receiving passages defined in the locking pin 76 and in a projection that may be secured to the longitudinal structural elements in any desirable manner. It will be necessary to remove the safety clip 88 from its assembly with the locking pin 76 in order to remove the locking pin from its locking relationship within the passage 74 and aperture 70.

It will also be desirable to achieve locking of the front and rear chassis structures in the extended position thereof as illustrated in FIG. 5. In accordance with the present invention, the forward extremity of the flexible connector plate 34 may be provided with an abutment plate 92 that may be butt welded or otherwise secured to the connector plate in such manner that side extremities of the abutment plate 92 extend beyond the side edges 94 and 96 of the connector plate 34. Locking plates 98 may be fixed to each extremity of the abutment plate 92 and may be oriented in substantially normal relationship with the abutment plate, essentially as illustrated in FIG. 7.

Adjacent the position of the locking plate 98, in the extended position of the connector plate 34, locking housings 100 may be secured to the underside of the longitudinal structural elements 38 and 40 as shown in FIGS. 5 and 7. Each of the locking housings may be provided with locking apertures 102 and 104 in opposed walls 106 and 108 thereof, which apertures may be positioned for registry with a locking aperture 110 formed in the locking plate 98 when the connecting element 34 is positioned as illustrated in FIG. 5. A locking pin 112 may be insertable through the registering apertures 102, 104 and 110 in order to secure the extensible connector plate relative to the longitudinal structural elements of the front trailer chassis.

A locking pin manipulating structure may also be employed that is substantially identical with respect to the locking pin actuator structure set forth in FIG. 6, if desired. A pair of actuating arm support elements 114 may be secured by welding or the like to the housing structure 100 and may define registering apertures through which a pivot pin 116 may extend for pivotal support of an operating handle 118. The operating handle may also have a pivotal connection with the locking pin 112 by virtue of a pivot pin 120 that is received through corresponding apertures formed in the actuating handle 118 and locking pin 112,. One extremity of the actuating handle is received within a slot formed at one extremity of the locking pin. A safety clip 122 may be extended through registering passages in a safety clip abutment 124 fixed to wall 106 of the housing 100 and through the locking pin 112. As in the case of safety clip 88, the safety clip 122 must also be removed from its assembled relation with the abutment 124 and pin 112 in order to allow actuation of the pin 112 to the unlocked position thereof, where it is extracted from its retaining relationship within the aperture 110 of the locking plate 98.

As illustrated in broken line in FIG. 5, establishment of various adjustable positions of the front and rear trailer chassis structures may be achieved simply by providing additional locking pin manipulating assemblies and locking apertures therefor, which may take the form illustrated in detail in FIG. 7 and described above.

Assuming the trailer mechanism to be operated as a trailer of substantially standard length, the front and rear chassis structures will be brought into assembly, causing the locking projections 62 and 64 to enter the respective openings 58 and 60 of the longitudinal structural elements 38 and 40. When this has occurred, the operating handles 84 may be manipulated in such manner as to insert the locking pins 76 through the registering apertures to the position illustrated in FIG. 6, thereby causing the front and rear trailer chassis structures to be assembled in substantially rigid relationship. Because of the short length of the locking projections 62, the fit between the locking projections and the openings 56 and 60 and because of the pivotal relationship that is established by positioning of the locking pin 76 within the locking aperture 70, the rear chassis structure will be allowed very slight pivotal movement about a generally horizontal axis defined by the pivot pins. This slight pivotal movement is virtually inconsequential from an operating standpoint, but it does allow the front and rear chassis structures to shift as necessary to prevent either or both of the structures from becoming excessively stressed during operating conditions.

Assuming it becomes desirable to extend the trailer mechanism to the position illustrated in FIG. 5, the safety clips 88 are removed from their assembled relationship with the projection 90 and locking pin 76 and the actuating handle 84 will be moved downwardly as shown in FIG. 6, causing locking pins 76 to be extracted from the respective locking apertures 70. This allows the front and rear chassis structures to be free for relative movement within limits defined by the fully assembled and fully extended positions of the flexible connector plate 34. The front and rear chassis structures then may be separated to the extent sufficient to bring the abutment plate 92 into engagement with the respective connector plate hanger assembly 56, at which point the latching aperture 110 will be disposed in registry with apertures 102 and 104 of the locking housing 100. The actuating handle 118 then may be rotated upwardly about the pivot pin 116, causing the locking pin 112 to be inserted into the locking aperture 110. After the safety clip 122 has been positioned through aligned apertures in the projection 124 and locking pin 112, the front and rear chassis structures will be locked in the extended position thereof and the trailer mechanism may be loaded and utilized in its extended condition.

As the trailer mechanism is operated over a roadway in its extended condition, the elongated connector plate 34 will resist any lateral misalignment between the front and rear chassis structures of the trailer mechanisms since the flexible plate 34 will be substantially rigid when considering the possibility of its bending about a vertical axis. The plate 34, however, is quite flexible when considering bending or yielding of the plate by movement of the rear wheels about a generally horizontal axis, therefore allowing the front and rear chassis structures to be substantially movable one relative to the other as the trailer is operated over undulating terrain. As shown in FIGS. 3 and 4, the flexible connector plate 34 is yieldable both downwardly and upwardly in order to compensate for changes in terrain, allowing the wheel and axle assemblies of both of the trailer chassis structures to be disposed in load supporting ground contact at all times.

In the event it is desired to transport extremely long and overweight loads or to accomplish specific spacing of the wheel and axle assemblies of a trailer mechanism, one or more additional chassis structures may be supported by wheel and axle assemblies and may be placed in trailing relationship with the first two chassis assemblies essentially as illustrated in FIG. 4. If this should become desirable, the trailer chassis structure 16 illustrated in FIG. 5 may be provided with connecting apertures, such as illustrated in broken line at 126 and 128 in FIG. 5, and may also be provided with locking pin manipulator mechanisms such as shown in broken line at 130 and 132. Likewise, a further trailing chassis structure such as shown at 134 in FIG. 4 may be provided with a connector plate 136 that may be fixed to the additional chassis structure 134 and may be disposed in movable telescoping relation with the chassis structure 16 immediately forward thereof. The chassis structure 16, in this case, will be provided with locking pin actuator systems 130 and 132 in order to establish locking relationship with the rear chassis structure and with the forward end of the flexible connector plate structure, depending upon the particular position of the rear chassis structure relative to the chassis structure disposed immediately forward thereof.

It will be desirable to provide for modification of conventional trailer mechanism in order to convert them for transportation of over-length loads. This can be done very simply by simply providing hanger assemblies beneath the trailer framework which will receive a flexible connector plate in slidable and adjustable relation therewith. Locking pin assemblies such as those set forth above may be connected to the framework of the trailer in such manner as to dispose locking pins in registry with locking openings formed in the trailer framework. The rear movable chassis structure of the trailer modification may take the form illustrated in the drawings, the design thereof perhaps being altered slightly as necessary to provide an interfitting relationship with the conventional trailer mechanism. Intermediate locking mechanisms may be provided on the forward trailer chassis in the event it may be desirable to provide for more than a single length adjustment for the extendable trailer assembly. In the alternative, the flexible connector plate may be disposed in fixed relation with the conventional trailer structure and the movable and lockable relationship may be established between the flexible connector plate and the rearward trailer chassis, if desired.

In view of the foregoing, it is apparent that the present invention provides a novel extendable trailer mechanism that is readily extendable from a contracted position for hauling loads of normal length to an extended condition for hauling loads of exceptional length and which will readily conform to the laws of most governmental agencies even though the loads are transported that are overlength and overweight for standard trailers. The invention also provides a trailer mechanism including at least front and rear chassis assemblies and perhaps additional trailing chassis assemblies which are capable of being disposed in substantially rigid relationship in the contracted condition of the trailer mechanism and are capable of being disposed in flexible relationship. Flexing of the connector plate element is accomplished about a generally horizontally disposed axis in the extended condition of the trailer mechanism to prevent undue stressing of the mechanical parts of the trailer mechanism when abrupt changes in grade are encountered during operation on roadways. The flexible connector element, establishing adjustable interconnection between the front and rear chassis structures, is capable of flexing only in the vertical direction to allow vertical shifting of the trailer chassis structures one relative to the other during operations on undulating roadways. The connector plate is substantially rigid from the standpoint of bending horizontally about a generally vertical axis, thereby positively maintaining the chassis structure in aligned condition at all times to provide for safe roadway handling at all times.

Another important feature provided by the invention is the facility for simple and efficient modification of conventional trailer mechanisms to provide for extension thereof without involving great expense. The invention, even though providing a transportation capability not ordinarily available is nevertheless of quite inexpensive nature.

In view of the foregoing, it is apparent that the present invention is one well adapted to attain all of the objects hereinabove set forth, together with other advantages which will become obvious and apparent from a description of the apparatus itself. It will be understood that certain combinations and subcombinations are of utility and may be employed without reference to other features and subcombinations. As many possible embodiments may be made of this invention without departing from the spirit or scope thereof, it is to be understood that all matters herein set forth or shown in the accompanying drawings are to be interpreted as illustrative and not in a limiting sense.

What is claimed is:

1. An extensible trailer mechanism adapted to be towed on a roadway by a tractor vehicle, said trailer mechanism comprising:
   first chassis means;
   a first wheel and axle assembly supporting said first chassis means;
   second chassis means;
   extension means engaging said first and second chassis means, said extension means being receivable in telescoping relation by at least one of said first and second chassis means in the contracted condition of said trailer mechanism and being extendable from said one of said first and second chassis means to extend the length of said trailer mechanism;
   a second wheel and axle assembly supporting said second chassis means and being in juxtaposed relation with said first wheel and axle assembly in the contracted condition of said trailer mechanism and being disposed in spaced relation with said first wheel and axle assembly in the extended relation of said trailer mechanism; and
   said extension means being flexible and securing said second chassis means in only a generally vertically movable relation to said first chassis means in the extended condition of said trailer mechanism.

2. An extensible trailer mechanism as recited in claim 1, wherein:
   said extension means is at least one substantially flat plate composed of flexible material.

3. An extensible trailer mechanism as recited in claim 2, wherein:
   said substantially flat plate is fixed relative to one of said first and second chassis means and adjustable between contracted and extended positions relative to the other of said first and second chassis means; and
   locking means is provided for establishing a locked relationship between said substantially flat plate and said one of said first and second chassis means in both the contracted and extended positions of said flat plate and said one of said first and second chassis means.

4. A trailer mechanism as recited in claim 1, including:
   means for retaining said first and second chassis means in generally rigid relation in the contracted condition of said trailer mechanism.

5. A trailer mechanism as recited in claim 1, wherein:
   said extension means securing said second chassis means in generally vertically movable relation with said first chassis means comprises an elongated towing plate being disposed in immovable relation to one of said first and second chassis means and being telescopically positionable in extended and contracted relationship with the other one of said first and second chassis means.

6. A trailer mechanism as recited in claim 5, wherein said means for retaining said first and second chassis means in generally rigid relation in the contracted condition of said trailer mechanism comprises:
   locking projection means being provided on one of said first and second chassis means;
   locking receiver means being provided on the opposite one of said first and second chassis means; and
   means for locking said locking projection means and said locking receiver means in immovable relation.

7. A trailer mechanism as recited in claim 6, wherein said retaining means comprises:
   locking pin means; and
   pin actuator means being carried by one of said first and second chassis means and being connected to said locking pin means, said pin actuator means being movable between a locked position, where said pin means secures said locking projection means and said locking receiver means in assembly, and an unlocked position, where said pin means is retracted and said locking projection means and said locking receiver means are released allowing said first and second chassis means to be free for extending movement.

8. A trailer mechanism as recited in claim 7, wherein:
   second locking projection means is defined at one extremity of said flexible means; and
   said pin means engages said second locking projection means to secure said first and second chassis means in substantially rigid relation in the extended relation thereof.

9. A trailer mechanism as recited in claim 1, wherein:
   said first and second chassis means are disposed in generally rigid relation in the contracted condition of said trailer mechanism and are disposed in said vertically movable relation in the extended condition of said trailer mechanism.

10. A trailer mechanism as recited in claim 1, including:
    interengaging locking means being defined on said first and second chassis means;
    locking pin means; and
    pin actuator means being carried by one of said first and second chassis means and being connected to said locking pin means, said pin actuator means being movable to a locked position where said pin means secured said interengaging locking means in assembly and an unlocked position where said locking pin means is retracted to release said interengaging locking means from locked interconnection and allowing said first and second chassis means to be free for extending and contracting movement.

11. An extendable trailer mechanism adapted to be towed by a tractor on a roadway, said trailer mechanism comprising:
    first chassis means;
    a first wheel and axle assembly supporting said first chassis means;
    second chassis means;
    extension means engaging said first and second chassis means, said extension means being receivable in telescoping relation by at least one of said first and second chassis means in the contracted condition of said trailer mechanism and being extendable from at least one of said first and second chassis means to extend the length of said trailer mechanism;
    a second wheel and axle assembly supporting said second chassis means and being in juxtaposed relation with said first wheel and axle assembly in the contracted condition of said trailer mechanism and being disposed in spaced relation with said first wheel and axle assembly in the extended relation of said trailer mechanism;
    said extension means comprising at least one flexible towing plate securing said first and second chassis means in generally rigid relation in the contracted condition of said trailer mechanism and establishing a vertically movable relation between said first and second chassis means in the extended condition of said trailer mechanism; and means for locking said first and second chassis means in said contracted and extended positions thereof.

12. An extendable trailer mechanism as recited in claim 11, wherein said first chassis means includes:
means defining towing plate receiver means; and
said flexible towing plate being fixed to said second chassis means and being telescopically receivable within said towing plate receiver means.

13. An extendable trailer mechanism as recited in claim 11, wherein said first and second chassis means includes:
interengaging locking means being defined on said first and second chassis means; and
locking connector means being carried by one of said first and second chassis means and being received in engagement with said interengaging locking means in the contracted condition of said trailer mechanism for locking said first and second chassis means in assembly.

14. An extendable trailer mechanism as recited in claim 13, wherein:
additional chassis means is disposed in trailing relation to said first and second chassis means; and
second flexible towing plate means carried by at least one of said second chassis means and additional chassis means establishes contractable and extendable connection between said additional chassis means and said second chassis means.

15. An extendable trailer mechanism as recited in claim 13, wherein:
said first chassis means has at least one locking aperture formed therein and at least a pair of spaced locking apertures are formed in said second chassis means;
said locking means comprises locking pin means being movably supported by one of said chassis means and being receivable within said locking apertures of said first and second chassis means; and
lock actuating means being carried by one of said chassis means and being controllably connected to said locking pin means, said lock activating means, upon being moved, inducing selective locking and unlocking movement to said locking pin means.

16. An extendable trailer mechanism as recited in claim 15, wherein:
first locking aperture means is formed in said first chassis means intermediate the extremities thereof and is aligned with said locking aperture means of said second chassis means in the contracted condition of said trailer mechanism; and
second aperture means is formed in said tubular support elements adjacent one of the extremities thereof and is aligned with said locking aperture means of said second chassis means in the extended condition of said trailer mechanism.

17. An extensible trailer mechanism as recited in claim 16, wherein:
interrelated structural support elements are provided on said first and second chassis means and prevent substantial vertical articulation of said first and second chassis means in the contracted condition of said trailer mechanism and allow vertical articulation of said first and second chassis means in the extended condition of said trailer mechanism, said flexible connector means prevents lateral articulation between said first and second chassis means in the extended condition of said trailer mechanism.

* * * * *